UNITED STATES PATENT OFFICE.

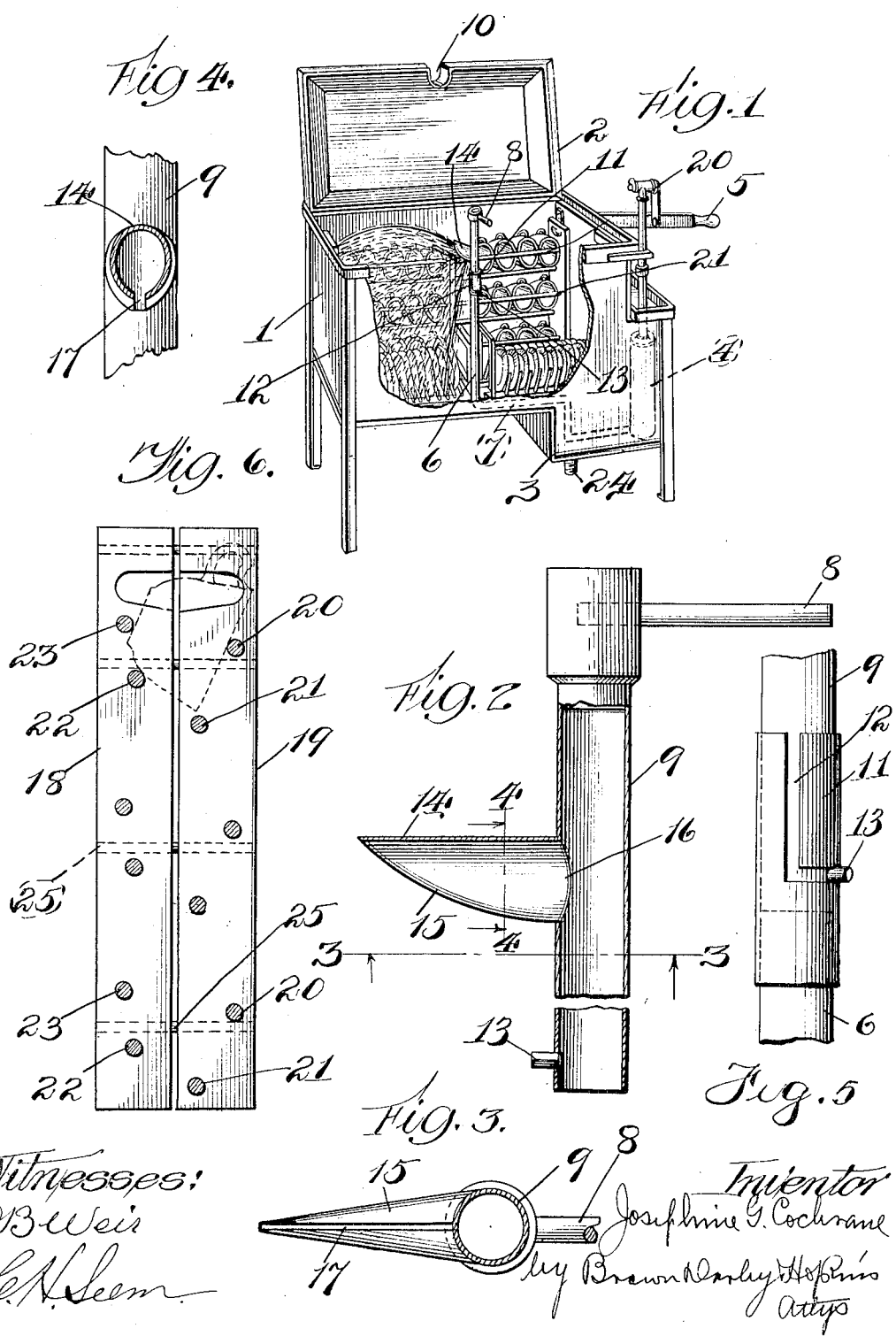

JOSEPHINE G. COCHRANE, OF CHICAGO, ILLINOIS.

DISH-WASHING MACHINE.

No. 852,419.

Specification of Letters Patent.

Patented May 7, 1907.

Application filed September 8, 1905. Serial No. 277,505.

*To all whom it may concern:*

Be it known that I, JOSEPHINE G. COCHRANE, a citizen of the United States, residing at Chicago, in the county of Cook and State of Illinois, have invented certain new and useful Improvements in Dish-Washing Machines, of which the following is a full, clear, and exact description.

My invention relates more particularly to hand operated dish washing machines and it has for its primary object to provide an improved, simple and efficient form of hand operated dish washing machine.

Another object of this invention is to provide an improved form of nozzle for searching every part of the interior or casing of the machine with a thin sheet of water.

Another object of the invention is to provide improved and simple means for holding cups, glasses and other like objects in an advantageous position for the application of the cleansing stream.

With these ends in view, the invention consists in certain features of novelty in construction, combination and arrangement of parts which will now be described with reference to the accompanying drawings and more particularly pointed out in the claims.

In the said drawings: Figure 1 is a perspective view of a dish washing machine embodying this invention, with the casing partially broken away. Fig. 2 is an enlarged side elevation, partly in vertical section, of the nozzle and its operating handle. Fig. 3 is a transverse section thereof on the line 3—3, Fig. 2. Fig. 4 is a detail section on the line 4—4, Fig. 2. Fig. 5 is a detail view of the joint between the nozzle and the stand pipe; and Fig. 6 is a vertical transverse section of the cup rack.

1 is a casing of any suitable form and construction provided with a hinged lid 2 and having at one end a pump chamber 3 in which is situated a force pump 4 of any appropriate form, which is capable of being operated by a handle or lever 5 for forcing water out of the chamber 3 and into a stand pipe 6 through any suitable connection of pipes 7, the stand pipe 6 being situated preferably at one side of the casing 1 and at about the mid length thereof, as better shown in Fig. 1, so as to be in an advantageous position for directing the spray or sheet of water therefrom against the dishes or other articles at all points within the casing. On the upper end of the stand pipe 6 is rotatably mounted a nozzle, which is of special and peculiar form for producing a sheet of water of the desired form and direction of flow from the minimum volume of water and the minimum force exerted thereon by the pump 4. In order that this nozzle may be readily rotated by one hand of the operator while the other hand manipulates the pump lever 5, the nozzle is provided with a laterally projecting handle 8 mounted upon the upper end of a short section of tube or pipe 9, which is closed at its upper end and is adapted to project through an aperture 10 in the edge of the lid 2 when the lid is closed, the aperture being open at one side so as to permit the lid to be opened and closed independently of the handle 8. The lower end of the tube 9 is provided with any suitable swivel connection with the stand pipe 6. In this exemplification of the invention, the upper end of the stand pipe has secured to it a collar 11, which constitutes a socket for receiving the lower end of the tube 9 and which is provided with an L-shaped slot 12 for the introduction and engagement of a locking lug or pin 13 projecting from the side of the tube 9 so that when the tube is inserted in this socket 11, it will be capable of rotation throughout the degree permitted by the horizontal portion of the L-slot, the lug 13 in the meanwhile holding the tube 9 from being forced out of its socket by the pressure of the water.

The discharge portion or member of the nozzle is so formed, constructed and arranged as to reduce the volume of water forced upwardly through the stand pipe 6 to a fan shaped sheet, as contradistinguished from spray, and which occupies a vertical plane while being capable of rotation on a vertical axis through the agency of the nozzle 8 for searching every point within the casing 1 throughout its entire width and length and from top to bottom, so that all of the articles supported at the side of the casing opposed to that on which the nozzle is situated, as well as all of those articles which are located upon the bottom of the casing, will receive the full force of such sheet. In order to produce a sheet of water of this form, the discharge member of the nozzle is constituted by a horizontal projecting protuberance whose upper side 14 is closed from end to end, while its lower side 15 is curved from a point level with the upper side downwardly to a point in conjunction with the lower edge of an opening 16 in the side of the tube 9, through which the water discharges into the said protuberance, and this lower curved edge of the protuberance is provided with a slot 17 from end to end. It will thus be seen that a discharge member is constituted, capable of casting a fan shaped sheet, with its edges extending horizontally and vertically, or substantially vertically, so that while all the water will be thrown with great force against the sides and the bottom of the dish chamber, none of it will be thrown or splashed out of the chamber.

The cup holding rack shown in detail in Fig. 6 consists of two supports 18 19 at each end of the casing 1 and a number of horizontal bars 20, 21, 22, 23 which connect these two pairs of supports together and which serve to support the cups in such a position that their open sides will be directed downwardly, as indicated in dotted lines in Fig. 6, so that particles dislodged by the spray will be washed and eventually carried to the bottom of the pump chamber 3, whence the suds and all objectionable matter may be removed through a connection 24. It will be seen that all four of the rods 20, 21, 22, 23, are required for supporting a cup, and it will be understood that this set of rods may be duplicated as often as the height of the supports 18, 19 will permit. The two rods 23, 22 and the two rods 20, 21, respectively, lie in planes which converge downwardly, the rods 20, 21 being respectively slightly lower than the rods 23, 22, and which rods 20, 21 are farther apart than the rods 22, 23, whereby the latter rods will serve to sustain the bottom and side of the cup while the rod 20 will be engaged by the top of the cup, the rod 21 serving to limit the downward movement of the cup in the event it should be small enough to descend an objectionable extent between the rods 20, 22. In order that the device may be adjustable for accommodating cups and glasses of various sizes, the supports 18, 19 are adjustable with relation to each other on a number of dowels or pins 25 passing therethrough, as shown in Fig. 6, whereby the standards may be wedged apart or driven together as may be required. By this arrangement of the horizontal bars 20, 21, 22, 23, it will also be seen that while the cups or glasses in the upper tier may be presented toward the horizontal portion of the stream and slightly inclined as described, the cups or articles of the lower tiers may be presented in a more or less downward direction so as to receive the full force of that portion of the stream which is directed toward them in a more or less inclined direction, thus enabling the cups in all of the tiers to receive the direct force of the stream in their interiors.

Having thus described my invention, what I claim as new therein and desire to secure by Letters Patent is:

1. In a dish washing machine, the combination of a casing for containing the articles to be washed, a rack situated in said casing comprising sections adjustably mounted with relation to each other, said sections embodying standards and horizontal bars adapted to co-operate with corresponding bars in adjacent section for the purpose of holding cups or the like, and means for directing a sheet of water toward said rack.

2. In a dish washing machine, the combination of a casing for containing the articles to be washed, a rack situated in said casing, comprising standards, horizontal bars mounted in said standards and adapted to hold cups or the like therebetween, and means for adjusting the relation of said bars with each other.

3. In a dish washing machine, the combination of a casing for containing the articles to be washed, a rack situated in said casing comprising standards, two pairs of horizontal bars connecting said standards together and being situated in inclined planes converging downwardly, the bars of one of said pairs being arranged closer together than the bars of the other, for holding a cup or the like with its upper end in a downwardly-presented position, the said standards embodying two upright supports, each of said upright supports carrying one pair of said horizontal bars, means for holding said supports in adjustable relation with each other, and means for directing a sheet of water toward the rack.

4. In a dish washing machine, the combination of a casing containing the articles to be washed, a stand-pipe arranged in said casing at one side thereof, a rack situated in said casing at the opposite side thereof, a nozzle rotatably mounted on the upper end of the stand-pipe, said nozzle adapted to project a vertical sheet or stream of water onto the said rack, said sheet or stream being of sufficient width in its rotative positions to reach from the lowermost to the uppermost portions of said rack, and means for forcing water into said stand-pipe.

5. In a dish washing machine the combination of a casing for containing the articles to be washed, a lid for closing said casing, provided with an open-sided aperture in the edge thereof, a stand pipe arranged in said casing in a position to coincide with said aperture, a nozzle rotatably mounted on the upper end of the stand pipe and provided with a handle projecting through said aperture when the lid is closed, said nozzle having a discharge protuberance extending in a horizontal direction below the lid, and means for forcing water into said stand pipe.

6. In a dish washing machine the combination of a casing for containing the articles to be washed, a rack situated in said casing and comprising standards, two pairs of horizontal bars connecting said standards together and being situated in inclined planes converging downwardly, the bars of one of said pairs being arranged closer together than the bars of the other, for holding a cup or the like with its upper end in a downwardly presented position, and means for directing a sheet of water toward said rack.

7. In a dish washing machine, the combination of a casing containing the articles to be washed, a rack at one side thereof, a stand-pipe at the opposite side thereof, means rotatively mounted on said stand-pipe for projecting a sheet or film of water in vertical planes onto said rack, said sheet or film being of sufficient width to reach from the bottom to the top of said rack, a compartment formed at one end of said casing, the bottom thereof being below the level of the bottom of said casing, and means within said compartment for forcing water into said stand-pipe.

JOSEPHINE G. COCHRANE.

Witnesses:
FRANCIS A. HOPKINS,
CHAS. H. SEEM.